United States Patent
Veligdan et al.

(10) Patent No.: US 7,025,461 B2
(45) Date of Patent: Apr. 11, 2006

(54) INTERACTIVE DISPLAY SYSTEM HAVING A DIGITAL MICROMIRROR IMAGING DEVICE

(75) Inventors: James T. Veligdan, Manorville, NY (US); Leonard DeSanto, Dunkirk, MD (US); Calvin Brewster, deceased, late of North Patchogue, NY (US); by Lisa Kaull, legal representative, West Bay Shore, NY (US)

(73) Assignee: Brookhaven Science Associates, Upton, NY (US)

( * ) Notice: Subject to any disclaimer, the term of this patent is extended or adjusted under 35 U.S.C. 154(b) by 62 days.

(21) Appl. No.: 10/650,958

(22) Filed: Aug. 28, 2003

(65) Prior Publication Data

US 2005/0047736 A1    Mar. 3, 2005

(51) Int. Cl.
G03B 21/26 (2006.01)
G03B 21/00 (2006.01)
G02B 6/42 (2006.01)
H04B 10/12 (2006.01)
G03H 1/00 (2006.01)

(52) U.S. Cl. ............... 353/37; 353/46; 353/121; 385/50; 385/131; 398/13; 398/113; 398/139; 398/141; 398/200; 359/34

(58) Field of Classification Search ............ 353/37, 353/46, 121–122, 77, 50–51, 64; 385/50, 385/131, 129; 398/13, 113, 134, 139, 141, 398/178, 200; 359/34; 348/771

See application file for complete search history.

(56) References Cited

U.S. PATENT DOCUMENTS

| | | | |
|---|---|---|---|
| 5,381,502 A | 1/1995 | Veligdan | 385/115 |
| 5,455,882 A | 10/1995 | Veligdan | 385/116 |
| 6,002,826 A * | 12/1999 | Veligdan | 385/120 |
| 6,175,679 B1 | 1/2001 | Veligdan et al. | 385/120 |
| 6,222,971 B1 | 4/2001 | Veligdan et al. | 385/120 |
| 6,301,417 B1 | 10/2001 | Biscardi et al. | 385/120 |
| 6,400,876 B1 | 6/2002 | Biscardi et al. | 385/120 |
| 6,519,400 B1 | 2/2003 | Biscardi et al. | 385/120 |
| 6,535,674 B1 | 3/2003 | Veligdan | 385/120 |
| 6,832,727 B1 * | 12/2004 | Veligdan | 235/462.32 |

* cited by examiner

*Primary Examiner*—W. B. Perkey
*Assistant Examiner*—Magda Cruz
(74) *Attorney, Agent, or Firm*—Reed Smith LLP; William J. McNichol, Jr.; Matthew J. Esserman

(57) ABSTRACT

A display system includes a waveguide optical panel having an inlet face and an opposite outlet face. A projector cooperates with a digital imaging device, e.g. a digital micromirror imaging device, for projecting an image through the panel for display on the outlet face. The imaging device includes an array of mirrors tiltable between opposite display and divert positions. The display positions reflect an image light beam from the projector through the panel for display on the outlet face. The divert positions divert the image light beam away from the panel, and are additionally used for reflecting a probe light beam through the panel toward the outlet face. Covering a spot on the panel, e.g. with a finger, reflects the probe light beam back through the panel toward the inlet face for detection thereat and providing interactive capability.

40 Claims, 5 Drawing Sheets

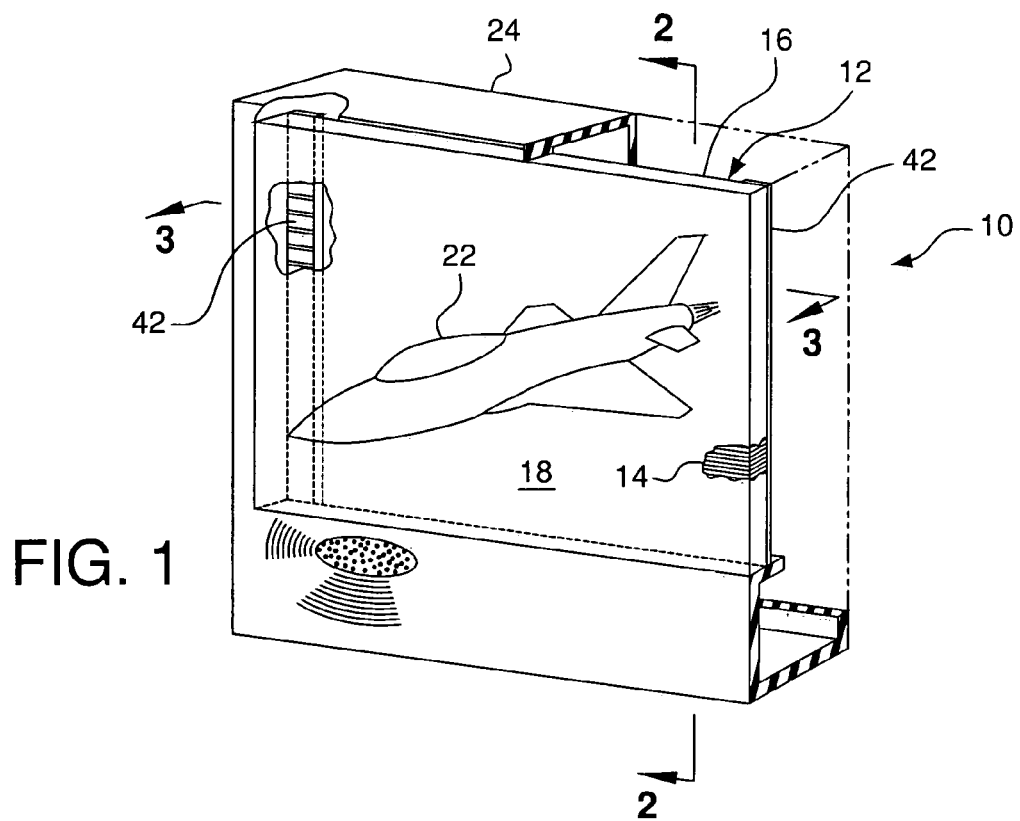
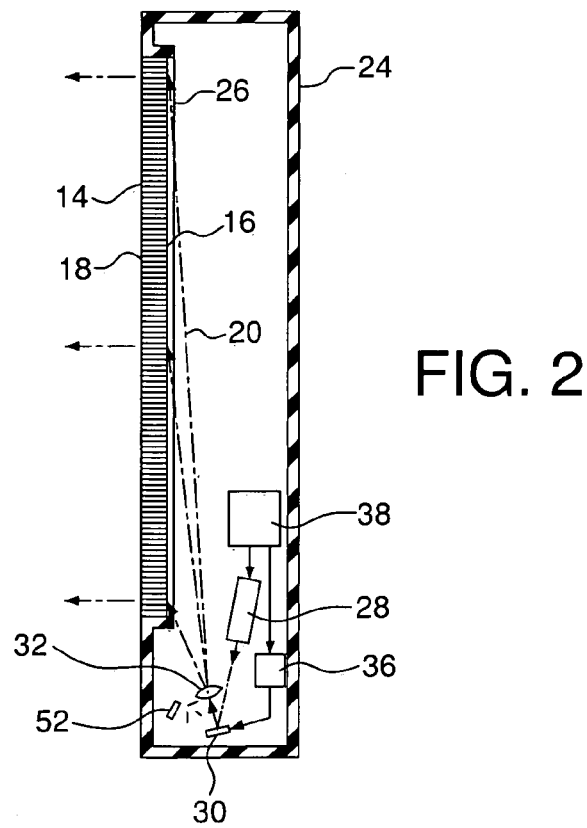

INTERACTIVE DISPLAY SYSTEM HAVING A DIGITAL MICROMIRROR IMAGING DEVICE

STATEMENT REGARDING FEDERALLY SPONSORED RESEARCH OR DEVELOPMENT

This invention was made with Government support under Contract No. DE-AC02-98CH10886 awarded by the Department of Energy. The Government has certain rights in this invention.

BACKGROUND OF THE INVENTION

The present invention relates generally to optical waveguides, and, more specifically, to optical panels formed therefrom.

U.S. Pat. No. 5,381,502 discloses a polyplanar optical display (POD) including ribbon optical waveguides laminated together. Image light is projected through an inlet face of the display for total internal reflection therein, with a video image being displayed at an opposite outlet face end of the panel.

U.S. Pat. No. 5,455,882 discloses another form of a POD panel configured for interactive operation. The video image is projected outbound through the stacked waveguides, and an interactive light beam may be directed inbound through the outlet face toward the inlet face for detection of its screen position for providing interactive capability.

In both patents, the similarly configured optical panels permit light transmission in either direction from the inlet face to the opposite outlet face, or from the outlet face to the opposite inlet face. This capability permits the use of the optical panels in various applications for providing high definition viewing screens for televisions, computer monitors, and various other types of viewing screens as desired.

Separate mechanical keyboards are commonly known for providing interactivity with various forms of display screens. However, mechanical keyboards are additional components which increase the size, complexity, and cost of the system.

Conventional touchscreens provide an alternate manner for interactive capability. The touchscreen may have various forms which overlay the outlet face and provide interactivity by simply pressing various portions of the touchscreen. The location of the touched spot is determined by the system and corresponds with an interactive option displayed by the outlet face through the touchscreen. Touchscreens are independent devices (i.e. separate from the outlet face) which increase the complexity and cost of the system.

Accordingly, it is desired to provide a display system having interactive capability with corresponding advantages in implementation.

BRIEF SUMMARY OF THE INVENTION

A display system of the present invention includes a waveguide optical panel having an inlet face and an opposite outlet face. A projector cooperates with a digital micromirror imaging device for projecting an image through the panel for display on the outlet face. The imaging device includes an array of mirrors, each mirror separately tiltable between opposite display and divert positions. The display positions reflect an image light beam from the projector through the inlet face of the panel toward the outlet face for display on the outlet face. The divert positions divert the image beam away from the panel, and are additionally used for reflecting a probe light beam through the inlet face toward the outlet face of the panel. Covering a spot on the panel reflects a portion of the probe light beam back through the panel from the outlet face towards the inlet face for detection thereat and providing interactive capability.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 1 is a partly sectional, elevational view of an interactive display system in accordance with an exemplary embodiment of the present invention.

FIG. 2 is a partly sectional side elevational view of the display system illustrated in FIG. 1 and taken along line 2—2 in FIG. 1.

DETAILED DESCRIPTION OF THE PREFERRED EMBODIMENTS

Figure 3:
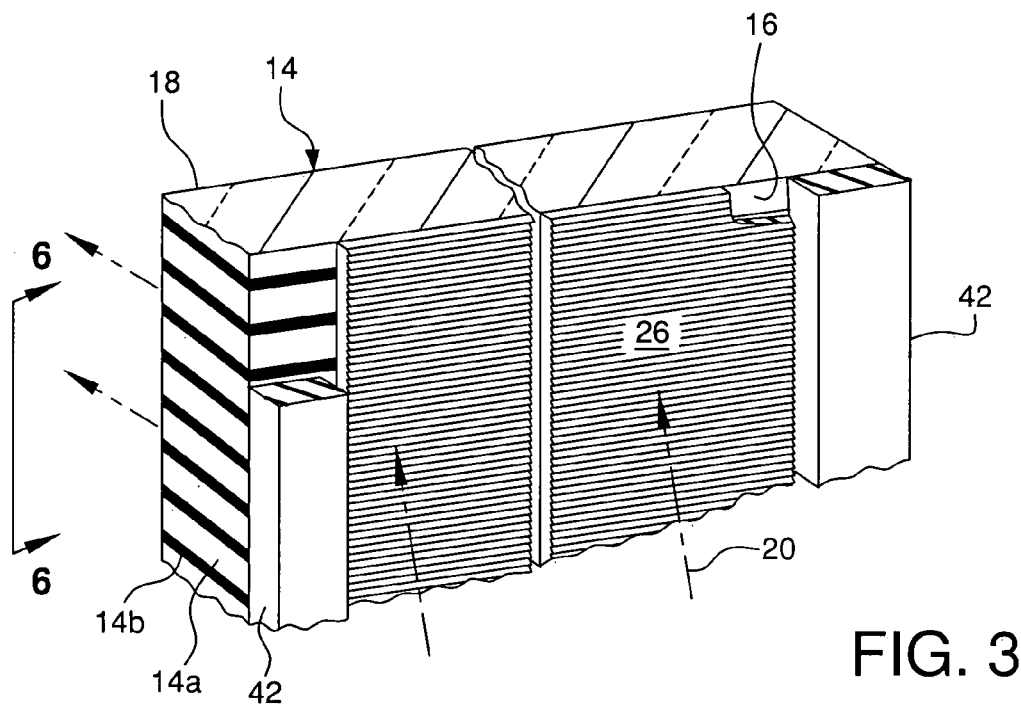
FIG. 3 is a partly sectional, enlarged view of a portion of the back of the optical panel illustrated in FIG. 1 and taken generally along line 3—3 in FIG. 1.

Illustrated in FIG. 1 is an interactive display system 10 in accordance with an exemplary embodiment of the present invention. The display system 10 is an assembly of components including an optical display panel 12 which includes a plurality of ribbon optical waveguides 14 which extend the full lateral or horizontal width of the panel 12 and are stacked together vertically or transversely to define the full height of the panel 12.

The optical panel 12 may have any conventional form with the waveguides being arranged in various manners such as the wedge of decreasing size shown in U.S. Pat. No. 5,381,502, issued to Veligdan. As shown in FIG. 2, the waveguides 14 preferably have substantially identical size and are stacked vertically together in a column having first or back ends thereof collectively defining a planar inlet face 16, and opposite second or front ends thereof collectively defining a planar viewing outlet face 18.

As shown in more detail in FIG. 3, each waveguide 14 includes an optically transparent core 14a disposed between cladding layers 14b. Due to the difference of index of refraction between the core 14a and cladding 14b, an image light beam 20 may be channeled through the individual waveguides 14 with total internal reflection in a conventional manner. As shown in FIG. 2, the image beam 20 is projected on the inlet face 16 for display on the outlet face 18 as an image (or video image) 22 illustrated in FIG. 1.

As shown in FIG. 3, the cladding 14b is preferably a dark color (e.g. black) for enhancing the contrast of the image as seen by an observer or user interacting with the display system 10.

As initially shown in FIGS. 1 and 2, the various components of the display system 10 may be mounted in a suitable housing 24 which is preferably relatively thin for minimizing the space requirements for the display 10. Since the inlet face 16 extends the full width and height of the panel 12, it is desirable to additionally provide a light coupler 26 over the inlet face 16 for redirecting the incident image light 20 to minimize the depth requirement of the housing 24.

In a preferred embodiment, the coupler 26 comprises Fresnel prismatic microscopic grooves which are straight along the full width of the panel 12 and spaced vertically apart along the height of the panel 12. A preferred form of the coupler 26 is a Transmissive Right Angle Film (TRAF) commercially available from the 3M Company of St. Paul, Minneapolis, under the trade name TRAF II. This TRAF film permits the image light 20 to be projected at a small acute angle over the back of the optical panel 12, and then redirected up to about 90 degrees for channeling through the waveguides 14 for display from the outlet face 18. Other types of couplers of the types mentioned in U.S. Pat. No. 6,301,417, issued to Biscardi et al, may be alternatively employed. Alternatively, the coupler 26 may be eliminated, and the image beam may be aimed directly at the inlet face in typical rear-projection fashion.

The optical panel 12 may have any suitable configuration utilizing a plurality of stacked optical waveguides in which light may be transmitted in either direction between the inlet face and outlet face sides thereof. As shown schematically in FIGS. 2 and 4, the optical panel 12 is mounted in the housing 24 for cooperating with a suitable light projector 28 having any conventional configuration for projecting the light used in forming any desired video image 22. The light exiting the projector 28 is preferably in the form of a beam, rather than diffuse light.

For example, the projector 28 may include a lamp for producing white light which is projected through suitable projection lenses for use in creating any desired video image 22 on the outlet face 18. Color may be added to the light beam by, for example, rotating a conventional color wheel in a known manner inside or outside the projector 28.

The projector 28 cooperates with a digital imaging device 30 for digitally creating the desired video image. Any suitable digital imaging device can be used, but a Digital Micromirror Device (DMD) imaging device 30 is preferred. The DMD 30 is an imaging device optically aligned between the projector 28 and the inlet face 16 which selectively reflects the image beam 20 through a cooperating projection lens 32 to form the video image. The imaging device 30 is a small semiconductor light switch including an array of, for example, thousands of microscopically sized image mirrors 34 each mounted on a hinge for being individually tilted back and forth, typically with an angular range of plus or minus 10 degrees when activated. When inactive, the individual micromirrors 34 assume an intermediate relaxed position. The DMD 30 is a conventional device commercially available from Texas Instruments Inc. of Dallas, Tex. for use in digital light processing in creating digital images for various applications.

Figure 4:
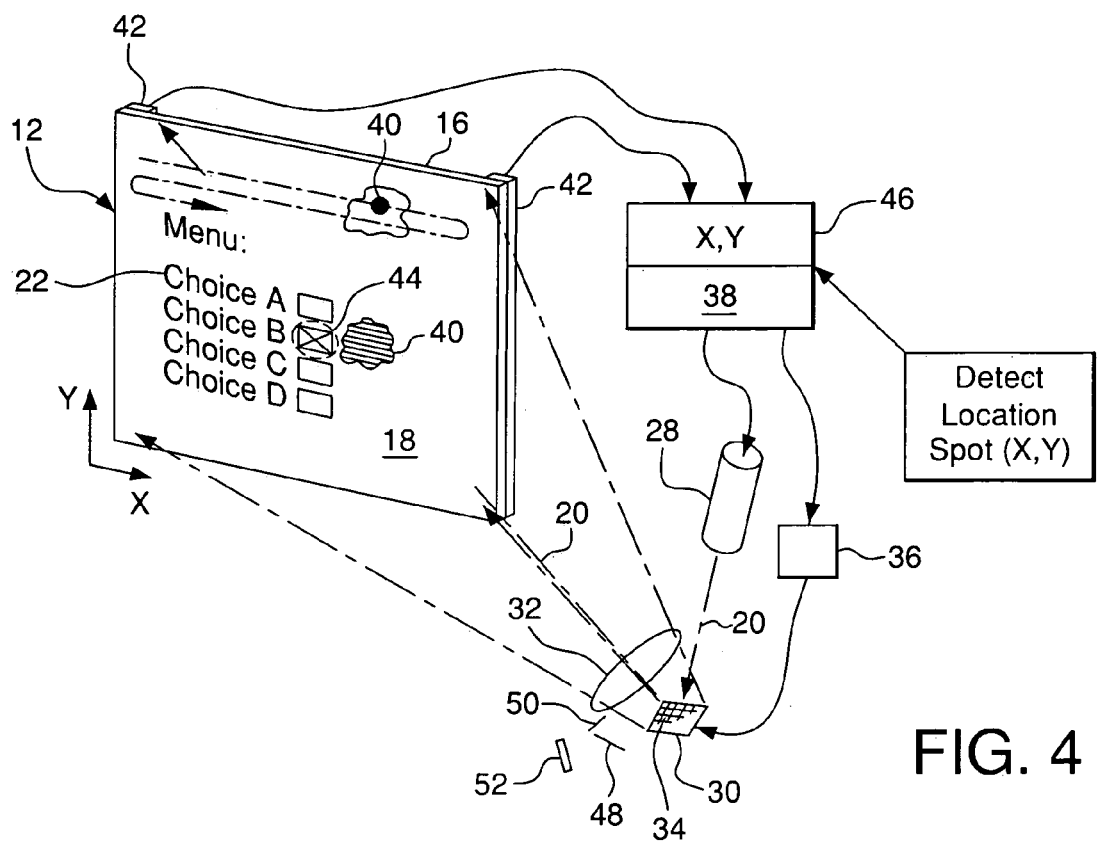
FIG. 4 is a schematic representation of the display system illustrated in FIGS. 1–3 including a digital micromirror imaging device therein for displaying images on the optical panel.

The DMD imaging device 30 is illustrated schematically in FIG. 4 in cooperation with a conventional electronic driver 36 which is used to independently control each of the thousands of micromirrors 34 therein. The imaging device 30 is operatively coupled to an electrical controller 38 through the driver 36 for controlling operation thereof and the form of the video image 22 displayed on the panel 12.

The controller 38 may take any conventional configuration such as a digital microprocessor programmed with suitable software for displaying any desired video image for any suitable purpose. The controller 38 may be used for displaying ordinary television video images from the panel 12, or other video images typically displayed on computer monitors, automated teller machines (ATM), etc.

For purposes of this disclosure, the term "outbound" is defined as the direction from the inlet face 16 towards the outlet face 18, and the term "inbound" is defined as the direction from the outlet face 18 towards the inlet face 16.

Figure 5:
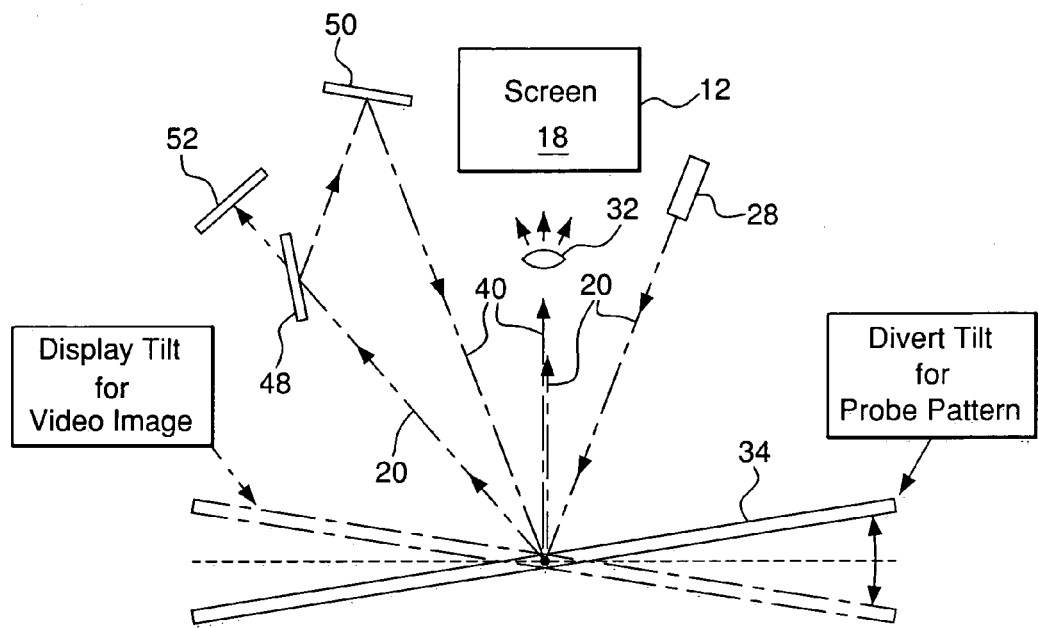
FIG. 5 is a schematic representation of the imaging device illustrated in FIG. 4 for displaying images on the optical panel and providing interactive capability.

FIG. 5 illustrates schematically a magnified exemplary one of the micromirrors 34 having a tilt orientation controlled by the controller 38. Each mirror 34 is tiltable between opposite display and divert positions which are typically plus or minus 10 degrees from a center or relaxed position when inactivated. The first or display position is illustrated in phantom line in FIG. 5 and is optically aligned between the projector 28 and the inlet face 16 of the panel 12 for reflecting the image beam 20 outbound into the inlet face 16 for display on the outlet face 18 to collectively form the desired video image. The second or divert position is illustrated in solid line and diverts the image beam 20 from the projector 28 away from the inlet face 16 to produce dark portions of the video image.

The individual micromirrors 34 separately define corresponding pixels of the entire video image having relatively bright and relatively dark portions of various colors as desired.

The operation of the DMD 30 in cooperation with the image projector 28 and the optical panel 12 is conventional for generating any desired video image thereon. In practice, the individual mirrors 34 oscillate rapidly between their display and divert positions for creating the video image with varying degrees of image intensity or contrast. Although the video image could be projected continuously in time, in an exemplary embodiment, the video image may be projected in cycles or temporal frames in the manner of ordinary television having a 60 Hertz image refresh rate.

In accordance with a significant feature of the present invention, the imaging device 30 may be additionally operated independently of producing the video image for providing interactive capability in a relatively simple manner using the available electronic components of the basic display system in a new manner.

More specifically, FIG. 5 illustrates schematically an exemplary configuration optically aligned with the imaging device 30 for reflecting an interactive or probe light beam 40 from the mirrors 34 in their divert positions outbound into the inlet face 16 of the optical panel 12 toward the outlet face. In this configuration, a way is provided for probing the outlet face 18 to determine if a user has touched any portion thereof for use in any interactive function. The optical panel 12 in this configuration defines not only a viewing outlet face 18 for the projected image, but also an integral touchscreen which may be used for any interactive capability desired.

FIG. 4 illustrates schematically a light sensor 42 disposed on the inlet side of the optical panel 12 and traversing the full height thereof for detecting light in the individual waveguides 14. The light sensor 42 may have any conventional form such as one or more photodiodes which detect light, including, for example, visible and infrared, and produce corresponding electrical signals corresponding therewith. The light sensor 42 is operatively coupled to the controller 38 for providing thereto an indication of detected light.

Figure 6:
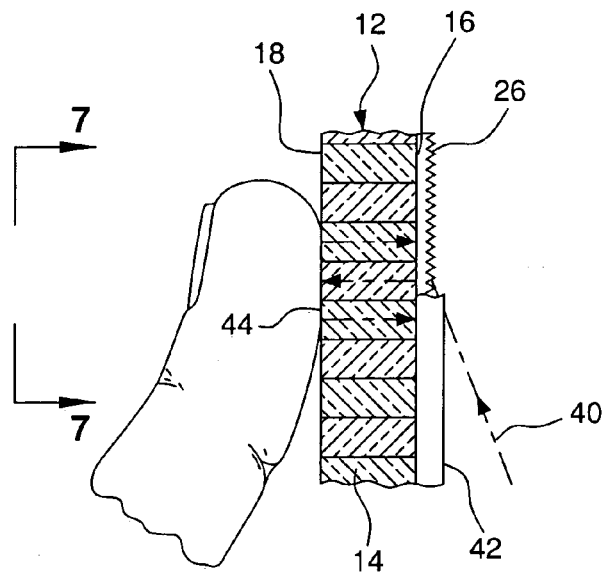
FIG. 6 is an enlarged, partly sectional elevational view of a portion of the optical panel illustrated in FIG. 3 and taken along line 6—6 in FIG. 3.

FIG. 6 illustrates, in more detail, operation of the outbound probe light beam 40 to the optical panel 12. The probe light beam 40 is displayed on the outlet face 18, and the user may use, for example, a finger to touch the outlet face 18 and cover a portion thereof in the form of a spot 44. The presence of the finger is effective for reflecting the covered portion of the displayed probe light beam 40 inbound in a reverse direction through the same or adjoining waveguides toward the inlet face 16. The reflected inbound probe light beam may then be detected by the light sensor 42 to indicate that the outlet face 18 has been touched, and in preferred embodiments may be used to identify the exact two-dimensional location of where the finger touches the outlet face 18.

This capability is useful for interactively operating the display system 10 as illustrated schematically in FIG. 4. The imaging device 30 may be used to project a visible image 22 in a suitable interactive form, such as a menu of choices available to the user. The user may then directly touch the outlet face 18 at any of the available choice locations identified by various positions of the spot 44. It is noted that the video image 22 itself is produced by positioning the micromirrors 34 to their respective display positions, whereas interactive feedback is effected when the mirrors are positioned in their divert positions. There are various manners in which both the video image may be displayed while providing interactive capability in a manner which is practically perceived as being simultaneous in time, although actual simultaneous operation is not necessary.

As shown in FIG. 5, the controller (not shown) is operatively coupled to the imaging device and is configured for selectively positioning the individual mirrors 34 between the display and divert positions to collectively form on the outlet face 18 the desired video image from the outbound image beam 20 while alternating temporally at least in part with any desired spatial probe pattern from the outbound probe light beam 40.

Figure 7:
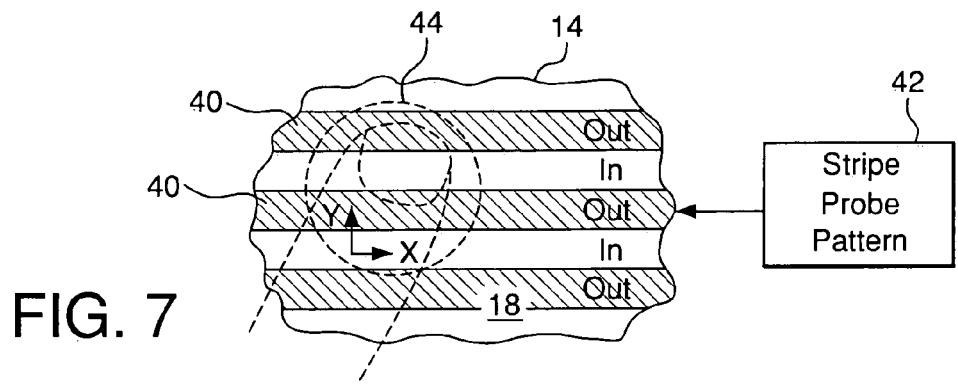
FIG. 7 is an enlarged front view of a portion of the optical panel illustrated in FIG. 6 and taken along line 7—7 in FIG. 6.

For example, FIGS. 6 and 7 illustrate an exemplary form of the probe light beam pattern generated by operation of the controller 38 specifically configured therefor. The probe pattern may include spatially alternating lateral stripes of the outbound probe light beam 40 in corresponding ones of the waveguides 14 across their full lateral extent corresponding with the width of the outlet face 18, with intermediate waveguides being devoid of the outbound probe light beam. In this way, spatially separated waveguides 14 are provided for respectively channeling the probe light beam 40 outbound from the inlet face 16 to the outlet face 18 where it may be reflected by the user under the covered spot 44 for inbound return through the optical panel toward the inlet face 16 for detection by the light sensor 42.

FIG. 6 illustrates the outbound probe light beam 40 through one waveguide under the covered spot 44, with the probe being reflected inbound through adjoining waveguides for detection by the sensor 42. The outlet face 18 may be covered, for example, with a finger, palm (or other body part), pencil eraser, stylus (i.e. preferably of blunt type), or paper (e.g. for bar-code reading purposes) for reflecting inbound at least a portion of the outbound probe light beam, the covering element either directly touching the outlet face 18 or providing a reflective surface spaced closely near the outlet face 18. A finger/palm is translucent thereby scattering the light and may therefore still reflect the probe light beam back through adjoining waveguides while contacting the outlet face 18.

As shown in FIGS. 4 and 6, the controller 38 is configured, using suitable software for example, for selectively positioning some of the mirrors 34 of the imaging device 30 to the divert positions for reflecting the probe light beam 40 through at least one outbound waveguide 14 and not through adjoining inbound waveguides for separately channeling the outbound and inbound probe light beams. In this way, some of the waveguides may be dedicated for projecting the outbound probe light beam, while other waveguides may be dedicated for detecting the reflected inbound probe light beam when any portion of the outlet face 18 is locally covered.

The controller 38 is operatively coupled to the light sensor 42 for detecting the inbound probe light beam upon covering the spot 44. And, the controller 38 is also configured for discriminating the inbound probe light beam from the outbound probe light beam, as well as from the outbound image beam forming the video image. This may be accomplished by using both spatial and temporal discrimination with the common optical panel 12 notwithstanding the independent projection of the image beam 20 and the probe light beam 40.

For example, operation of the imaging device 30 may be used for alternately temporally projecting either the video image or the desired probe pattern. The video image may be used for displaying any desired menu for interactive response. And, temporally interwoven with the video image, the controller 38 may be operated for detecting the interactive response from the light sensor 42 upon covering any portion of the outlet face 18.

As illustrated schematically in FIGS. 1, 3, and 4, the light sensor 42 is preferably in the form of a linear array of photodiodes which traverse the waveguides over the height of the inlet face 16 for detecting any light therein. A suitable light sensor is a linear image sensor with a monolithic self-scanning photodiode array having, for example, 1,024 diodes therein as commercially available from the Hamamatsu Corporation of Japan. This exemplary sensor is effective for detecting visible through infrared (IR) light. And, these arrays may be arranged in a linear group to traverse all of the waveguides over the height of the optical panel. In this way, the vertical or Y-position of each of the waveguides may be associated with corresponding ones of the photodiodes so that detection of light in any waveguide can be used for determining its transverse or vertical position Y.

As also shown in FIGS. 1, 3, and 4, a pair of substantially identical light sensors 42 is preferably used, with a first array of photodiodes traversing the first or left side of the optical panel 12, and a second array of the photodiodes traversing the opposite second or right side of the optical panel 12. Both left and right arrays are operatively coupled to a conventional comparator 46 associated with the controller 38. The comparator 46 then compares the relative strength of the light detected at the left and right ends of the waveguides for interpolating a corresponding lateral or horizontal X position therebetween. In this way, wherever the spot is covered over the two-dimensional width and height of the outlet face 18, the light sensors 42 may be used to accurately determine the lateral X position and transverse Y position thereof.

Various forms of probing the panel outlet face 18 for covered portions thereof may be used in combination with the imaging device 30. FIG. 5 illustrates an exemplary embodiment in which the probing configuration involves a dichroic element 48 which may have any conventional configuration such as a dichroic mirror optically aligned with the imaging device 30 for reflecting an infrared (IR) component of the image beam 20 itself as the probe light beam 40 back to the mirrors 34 in the divert positions thereof for projecting the IR beam 40 into the panel inlet.

The dichroic mirror 48 is optically aligned with the mirrors 34 in their divert positions and cooperates with a plain folding mirror 50 optically aligned therebetween. In this way, the original light beam from the projector 28 which is diverted by the micromirrors 34 may be directed against the dichroic element 48 for reflecting the IR component thereof to the folding mirror 50 for return to the mirror 34 in its divert position which is then reflected (in the same outbound viewing image path) through the projection lens 32 for channeling through the optical panel 12 for display on the outlet face 18 in an IR probe pattern.

In the preferred embodiment illustrated in FIG. 5, a light dump 52 is optically aligned with the dichroic element 48 linearly therewith at the end of the same path from the divert position mirror 34 for absorbing the visible light components of the diverted image beam 20 as the IR component is reflected from the dichroic element 48. The light dump 52 may have any conventional form such as a black surface for enhancing contrast of the video image. Since the video image is collectively formed by the individual pixels of the entire array of micromirrors, the diverted or display-off positions thereof are used to define the relatively black portions of the video image as compared to the relatively bright portions thereof formed by the reflected image light from the mirrors in their display or on positions.

The use of infrared light for probing the outlet face 18 for interactive feedback upon covering any portion thereof substantially increases discrimination between the interactive probing function and the inherent display of the video image. The video image is based on visible light which is subject to detection in the light sensors 42. By utilizing the controller 38 to synchronize operation of the light sensors 42 and the probe pattern, interactive feedback and detection of the inbound probe light beam may be limited in time to only those intervals in which the probe pattern is displayed as opposed to the time in which the video image is displayed. The probe pattern may therefore be effectively decoupled from generation of the video image in time so that the light sensors are used to detect touching of the outlet face 18 only during the interval of probe pattern generation.

Figure 9:
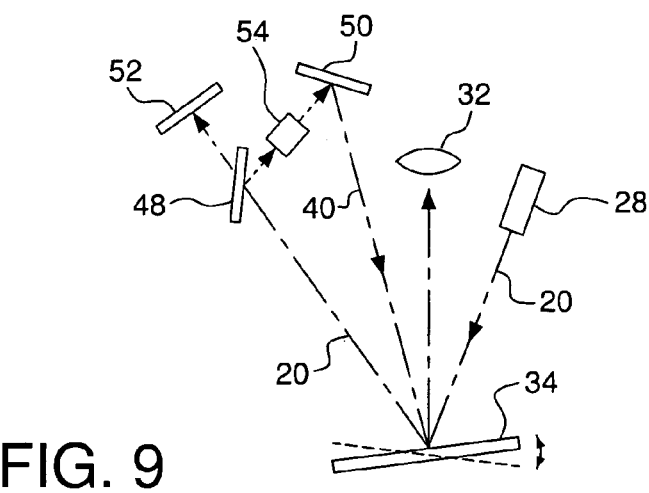
FIG. 9 is a schematic view, similar to FIG. 5, of an imaging device, in accordance with an alternate embodiment of the present invention.

To further enhance the ability of the light sensors 42 to discriminate reflection of the probe light beam from background or extraneous light, FIG. 9 illustrates an alternate embodiment of the invention similar to the FIG. 5 embodiment but additionally including a light modulator 54 optically aligned with the imaging device 30 in any portion of the probe light beam loop for modulating the IR probe light beam 40 in any suitable form such as amplitude modulation or frequency modulation. The modulator 54 may take any conventional form for modulating the IR probe light beam 40 to distinguish the probe light beam from extraneous infrared light either normally entering the outlet face 18 during operation or found in the panel 12 from the image beam 20 itself which includes both visible and infrared light.

Correspondingly, the controller 38 is configured for detecting the so-modulated probe light beam as sensed by the light sensors 42 during operation. In this way, the modulated inbound probe light beam may be distinguished over any other light detected by the light sensors for accurately locating the covered spot.

In FIGS. 5 and 9 described above, the IR component of the image light 20 is circulated back in a loop to the micromirrors 34 in their divert positions for forming the desired IR probe pattern on the outlet face 18. In this way, the image beam which is otherwise wasted in the divert positions may now be partially used for the additional function of probing the outlet face 18 for detecting interactive feedback.

Figure 10:
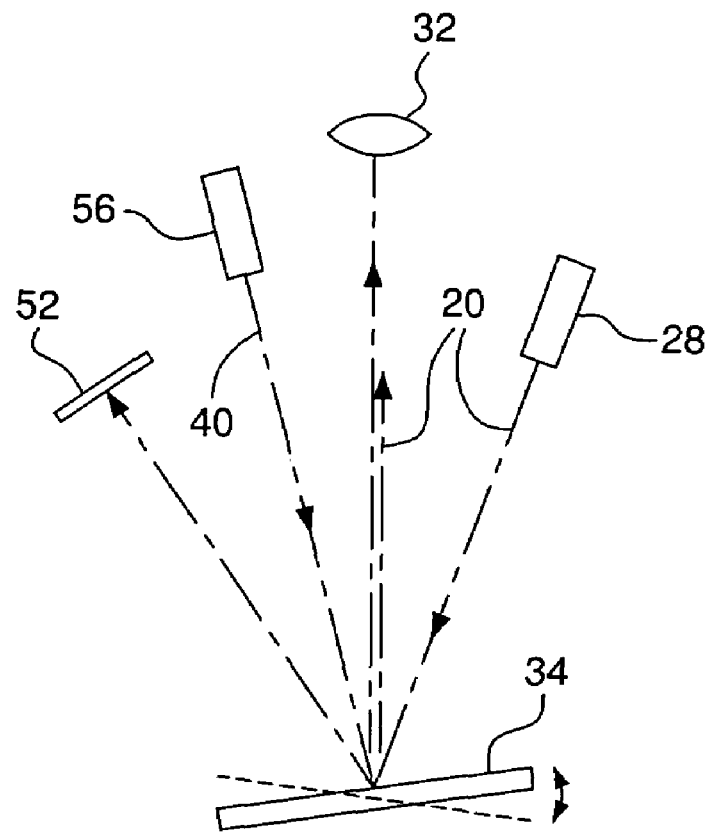
FIG. 10 is a schematic view, similar to FIG. 5, of an imaging device, in accordance with an alternate embodiment of the present invention.

However, FIG. 10 illustrates another embodiment of the invention which operates in a similar manner as those illustrated in FIGS. 5 and 9, yet the probing configuration includes an independent infrared light projector 56 optically aligned with the micromirrors 34 of the imaging device in their divert positions for emitting and reflecting the IR probe light beam 40 from the mirrors 34 in their divert positions outbound into the inlet face 16 toward the outlet face of the display panel 12. In this embodiment, the light dump 52 is directly optically aligned with the imaging device for absorbing the image beam 20 when the mirrors are tilted to their divert positions.

The operation of the embodiment illustrated in FIG. 10 is the same as that described above for temporally alternating display of the video image and the probe pattern for interactive capability. The video image may include any desired interactive menu so that covering selected spots on the outlet face 18 will reflect back into the panel at least a portion of the outbound probe light beam. The two dimensional position of the covered spot may then be determined in the controller by identifying the transverse or vertical position Y of the waveguides in which the return beam is channeled, along with comparing the relative strength of the return beam between the left and right light sensor arrays for determining the lateral or horizontal X position. The so-identified covered spot on the outlet face 18 may then be used in any conventional manner for interactive capability such as inputting information into the controller for any desired application of interactive capability.

Figure 8:
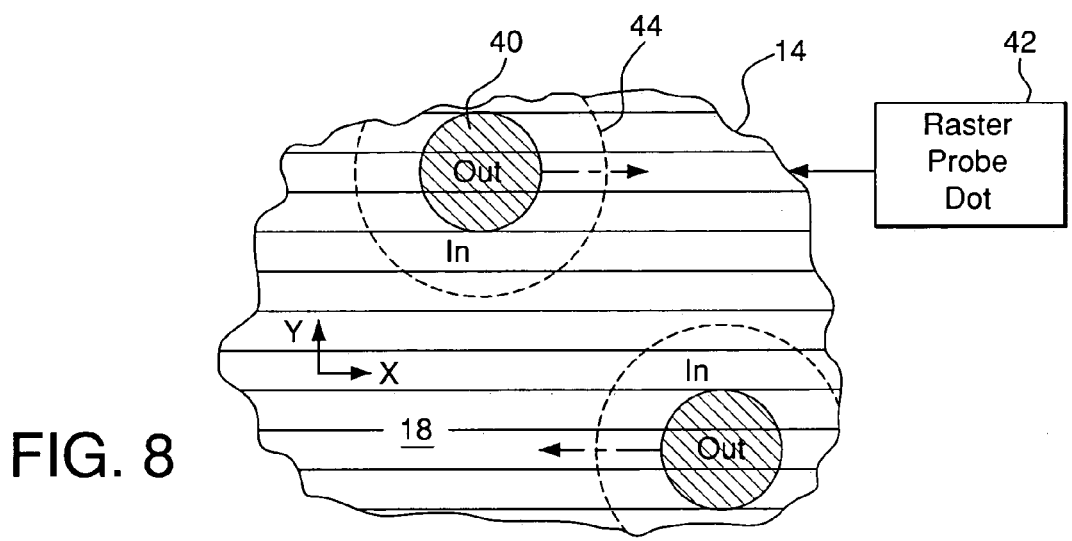
FIG. 8 is an enlarged front view of a portion of the optical panel illustrated in FIG. 6, similar to FIG. 7, showing an alternate probe pattern for interactive capability.

As shown in FIGS. 4 and 7, the controller 38 may be configured for producing any desired probe pattern such as the alternating stripes corresponding with the individual waveguides 14. Another exemplary probe pattern is illustrated in FIG. 8 in conjunction with FIG. 4 in which the controller 38 is configured for rastering the probe light beam 40 in a traveling dot over any portion of the outlet face 18 wherein interactive activity is desired. As the probing dot passes under any covered spot 44 on the outlet face 18, at least a portion of the outbound probe light beam may then be reflected under the spot to form the inbound probe light beam in one or more waveguides surrounding the dot.

Since an accurate position of the traveling dot along the X,Y axes may be inherently determined in the controller 38, the position of the covered spot 44 may be readily determined as that X,Y position at which the light sensor detects the inbound probe light beam. In this embodiment, both left and right light sensor arrays are not required since any simple light sensor configured for detecting the inbound probe light beam in the waveguides is sufficient for coordinating or synchronizing spot detection with the traveling dot of known position.

The exemplary embodiments disclosed above are indicative of the variety of possibilities for effecting interactive capability in the stacked waveguide optical panel 12 in combination with the digital micromirror imaging device 30. The corresponding method of operating this combination is illustrated schematically in FIGS. 4 and 5 and includes selectively tilting the micromirrors 34 to respective display positions for reflecting the image light 20 from the projector 28 through the optical panel 12 to display any desired video image 22. The mirrors 34 are also selectively tilted to the respective divert positions thereof to divert the image light away from the panel 12 to interrupt the video image between frames thereof. The probe light beam (e.g. obtained by utilizing dichroic element 48 as explained above) may then be reflected from the mirrors in their divert positions outbound into the optical panel 12 for displaying the probe pattern on the outlet face 18 in corresponding pattern frames alternating with the image frames temporally.

Upon covering any suitable spot 44 on the outlet face 18, the location of that spot may be detected using one or more light sensors as described above. Logical coordination of the location of the covered spot 44 and the corresponding menu may then be used in any conventional manner for interactive capability.

In the preferred embodiment, the video image 22 and the pattern of the probe light 40 are temporally alternated on the outlet face 18 in corresponding independent frames thereof. For example, the video image 22 may be displayed at 60 Hertz, with the probe pattern being displayed also at 60 Hertz in the otherwise blank frames between the image frames.

Furthermore, the outbound and inbound probe light beams are preferably separately channeled through adjoining waveguides 14 to create any desired probe pattern such as the alternating stripes, or traveling dot in a background field preferably devoid of the video image. Of course, as an alternative, the inbound and outbound probe light beams may both be transmitted within the same waveguide.

Since the image light 20 typically includes both visible and IR light, the probe light beam 40 is preferably IR light only for providing enhanced discrimination of the probe light within the waveguides relative to extraneous or other background light found therein. In this way, the controller may be used in conjunction with the light sensor for detecting solely the IR inbound probe light beam as distinguished from extraneous light in the waveguides. Any suitable form of modulation of the probe light beam may be used to enhance discrimination of the detection of the reflection thereof inbound into the waveguides for improving interactive capability.

In the exemplary embodiment illustrated in FIG. 5, the IR light component from the image light 20 is separated by the dichroic element 48 and returned by the folding mirror 50 back to the micromirrors 34 in their divert positions for creating the IR probe light beam projected through the panel 12.

In the alternate embodiment illustrated in FIG. 10, an independent IR light projector 56 is used for reflecting the probe light beam 40 from the mirrors 34 in their divert positions through the optical panel 12 for providing the interactive probing capability. The IR light projector 56 preferably projects modulated IR light therefrom. Or, a separate light modulator (i.e. similar to the light modulator 54 described above with reference to the FIG. 9 embodiment) for modulating the IR probe light beam 40 may be employed in the IR probe light beam path.

A particular advantage of the DMD imaging device 30 is that the micromirrors thereof are rapidly switched between their display and divert positions in microseconds for not only generating the desired video image on the outlet face 18 but controlling the relative brightness of the individual pixels thereof. The switching of the micromirrors is orders of magnitude faster than the refresh rate of the video image typically broadcast at about 60 Hertz.

Accordingly, the probe pattern may be intermeshed temporally and/or spatially with the video image in various manners for providing seamless and invisible interactive capability without compromising the high definition of the displayed video image. The probe pattern may be displayed in frames between alternating frames of the video image using the entire available surface area of the outlet face 18 if desired. Or, the probe pattern may be displayed simultaneously in any local portion of the outlet face 18 surrounded by the video image.

The probe pattern is preferably displayed temporally independently of the video image for improving the discrimination of the light sensors for detecting the inbound probe light beam in contrast with extraneous light carried by the waveguides including that used for forming the video image itself. With suitable modulation of the probe light beam for distinguishing it over extraneous light (including that used for forming the video image itself), the probe pattern may be displayed simultaneously with the video image for effective operation.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

We claim:

1. A display system, comprising:
   an optical panel including a plurality of optical waveguides stacked together, with first ends thereof defining an inlet face, and opposite ends thereof defining an outlet face;
   a projector for projecting an image light beam;
   a digital micromirror imaging device optically aligned between said projector and said inlet face for selectively reflecting said image light beam to said panel for forming an image on said outlet face, said imaging device including an array of mirrors each separately tiltable between opposite display and divert positions, with said display position reflecting said image light beam outbound into said inlet face toward said outlet face for display on said outlet face, and said divert position diverting said image light beam away from said inlet face;
   a probe element optically aligned with said imaging device for directing a probe light beam toward said mirrors in said divert positions, wherein said mirrors reflect the probe light beam outbound into said inlet face toward said outlet face; and
   a light sensor that senses said probe light beam traveling inbound through said waveguides toward said inlet face upon covering a spot on said outlet face.

2. A display system according to claim 1 further comprising a controller operatively coupled to said imaging device and configured for independently selectively positioning said mirrors between said display and divert positions to collectively form on said outlet face said image from said outbound image light beam alternating temporally with a probe pattern from said outbound probe light beam, with said probe pattern including adjoining waveguides for respectively channeling said probe light beam outbound to said outlet face and reflection thereof under said covered spot inbound to said light sensor.

3. A display system according to claim 2 wherein said controller is configured for positioning some of said mirrors to said divert positions for reflecting said probe light beam through at least one outbound waveguide and not through at least one adjoining inbound waveguide for separately channeling said outbound and inbound probe light beams.

4. A display system according to claim 2 wherein said controller is operatively coupled to said light sensor for detecting said inbound probe light beam upon covering said spot.

5. A display system according to claim 2 wherein said controller is operatively coupled to said light sensor for discriminating said inbound probe light beam from said outbound probe light beam and from said outbound image light beam forming said image.

6. A display system according to claim 2 wherein said light sensor traverses said waveguides for detecting light therein and is operatively coupled to said controller for determining which waveguides said inbound probe light beam is channeled.

7. A display system according to claim 6 wherein said controller is configured for rastering said probe light beam in a traveling dot over said outlet face and determines a position of said spot upon detection by said light sensor of said inbound probe light beam in at least one waveguide surrounding said traveling dot.

8. A display system according to claim 6 wherein said light sensor comprises an array of photodiodes traversing said waveguides for detecting light therein, and said controller is configured for determining a transverse position of said covered spot upon detection by said light sensor of said inbound probe light beam in at least one waveguide under said spot.

9. A display system according to claim 6 wherein:
said light sensor comprises a first array of photodiodes traversing one side of said optical panel, and a second array of photodiodes traversing an opposite second side of said optical panel; and
said controller further comprises a comparator operatively coupled to said first and second photodiode arrays for determining a lateral position of said covered spot in response to a comparison of the relative strength at said first and second photodiode arrays of said detected inbound probe light beam in said waveguides under said spot.

10. A display system according to claim 9 wherein said controller is configured to produce said probe pattern including alternating lateral stripes of said outbound probe light beam in corresponding waveguides, with intermediate waveguides being devoid of said outbound probe light beam.

11. A display system according to claim 2 wherein said probe element comprises a dichroic element optically aligned with said imaging device for reflecting an infrared component of said image light beam as said probe light beam back to said mirrors in said divert positions for reflecting said probe light beam into said inlet face.

12. A display system according to claim 11 further comprising a folding mirror optically aligned between said dichroic element and said imaging device for reflecting said infrared probe light beam back to said imaging device for reflection into said inlet face.

13. A display system according to claim 12 wherein said probe element further comprises an optical modulator optically aligned with said imaging device for modulating said infrared probe light beam to enable the controller to distinguish said probe light beam from extraneous light in said waveguides.

14. A display system according to claim 12 further comprising a light dump optically aligned with said dichroic element for absorbing visible light components of said image light beam as said infrared component is reflected from the dichroic element.

15. A display system according to claim 2 wherein said probe element comprises an infrared light projector optically aligned with said imaging device for directing an infrared probe light beam toward said mirrors in said divert positions for reflection therefrom outbound into said inlet face.

16. A display system according to claim 15 wherein said probe element further comprises an optical modulator optically aligned with said imaging device for modulating said infrared probe light beam to enable the controller to distinguish said probe light beam from extraneous light in said waveguides.

17. A display system according to claim 15 further comprising a light dump optically aligned with said imaging device for absorbing said image light beam reflected from said mirrors in said divert positions.

18. A display system according to claim 1 wherein each of said waveguides extends horizontally across a width of said panel, and said waveguides being stacked together vertically along a height of said panel.

19. A display system according to claim 1 wherein said covering of said spot is performed by at least one covering element selected from the group consisting of finger, palm, pencil eraser, stylus, and paper.

20. A display system according to claim 19 wherein said covering element reflects at least a portion of said outbound probe light beam into an adjoining waveguide to thereby provide said inbound probe light beam.

21. A display system according to claim 19 wherein said covering element is in contact with said outlet face.

22. A display system according to claim 19 wherein said covering element is spaced from said outlet face.

23. A display system according to claim 1 wherein said waveguides are in the form of ribbons.

24. A method of providing interaction in a display system having a stacked waveguide optical panel displaying on an outlet face thereof an image reflected from tiltable mirrors of a digital micromirror imaging device illuminated with image light from a projector, said method comprising:
selectively tilting said mirrors to respective display positions for reflecting said image light from said projector through said panel to display said image;
selectively tilting said mirrors to respective divert positions to divert said image light from said projector away from said panel;
reflecting a probe light beam from said mirrors in said divert positions outbound into said optical panel for display as a probe pattern on said outlet face; and
detecting reflection of at least a portion of said probe light beam inbound from said outlet face under a covered spot on said outlet face to determine a location of said covered spot.

25. A method according to claim 24 wherein said image and probe pattern are temporally alternated on said outlet face.

26. A method according to claim 24 wherein said outbound and inbound probe light beams are separately channeled through adjoining waveguides.

27. A method according to claim 24 wherein said image light from said projector includes both visible and infrared light, and said probe light beam is infrared light.

28. A method according to claim 27 further comprising separating said infrared light from said image light and returning said separated infrared light to said mirrors in said divert positions for creating said probe light beam which is reflected through said panel.

29. A method according to claim 28 wherein the separating of said infrared light from said image light is performed using a dichroic element.

30. A method according to claim 29 wherein the returning of said separated infrared light to said mirrors in said divert positions is performed using a folding mirror.

31. A method according to claim 29 further comprising absorbing the remaining visible light with a light dump subsequent to the separation of said infrared light using said dichroic element.

32. A method according to claim 24 further comprising modulating said probe light beam to distinguish said probe light beam from extraneous light in said panel.

33. A method according to claim 24 further comprising reflecting said probe light beam from said mirrors in said divert positions from an independent projector therefor.

34. A method according to claim 33 further comprising modulating said probe light beam to distinguish said probe light beam from extraneous light in said panel.

35. A method according to claim 24 wherein each of said waveguides extends horizontally across a width of said panel, and said waveguides being stacked together vertically along a height of said panel.

36. A method according to claim 24 wherein said covered spot is effected by at least one covering element selected from the group consisting of finger, palm, pencil eraser, stylus, and paper.

37. A method according to claim 36 further comprising reflecting at least a portion of the outbound probe light beam with said covering element into an adjoining waveguide to thereby provide said inbound probe light beam.

38. A method according to claim 36 wherein said covering element is in contact with said outlet face.

39. A method according to claim 36 wherein said covering element is spaced from said outlet face.

40. A method according to claim 24 wherein said waveguides are in the form of ribbons.

* * * * *